United States Patent
Uno et al.

(10) Patent No.: US 7,342,697 B2
(45) Date of Patent: Mar. 11, 2008

(54) HOLOGRAM RECORDING MEDIUM

(75) Inventors: Kazushi Uno, Kawasaki (JP); Kouichi Tezuka, Kawasaki (JP); Hiroyasu Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 11/211,910

(22) Filed: Aug. 25, 2005

(65) Prior Publication Data
US 2006/0114536 A1 Jun. 1, 2006

(30) Foreign Application Priority Data
Nov. 30, 2004 (JP) ............................... 2004-347028

(51) Int. Cl.
*G03H 1/28* (2006.01)

(52) U.S. Cl. ................. 359/24; 359/3; 359/35
(58) Field of Classification Search ............. 359/22, 359/24, 35
See application file for complete search history.

(56) References Cited

U.S. PATENT DOCUMENTS
2005/0141067 A1 * 6/2005 Ogasawa et al. ............. 359/22

FOREIGN PATENT DOCUMENTS
JP 09-305978 11/1997

* cited by examiner

*Primary Examiner*—Fayez G. Assaf
(74) *Attorney, Agent, or Firm*—Greer, Burns & Crain, Ltd.

(57) ABSTRACT

A hologram recording medium includes a hologram recording layer and a transparent substrate layer stacked on the hologram recording layer. The recording layer records an interference pattern of a recording beam and a reference beam. The transparent substrate layer has an inner surface facing the hologram recording layer, and this surface is formed with trace zones for guiding the recording beam and the reference beam in a prescribed guide direction. The trace zones have a higher reflectance than that of the remaining area in the inner surface of the transparent substrate layer.

9 Claims, 10 Drawing Sheets

HOLOGRAM RECORDING MEDIUM

BACKGROUND OF THE INVENTION

1. Field of the Invention

The present invention relates to a hologram recording medium where a hologram is recorded by overlapping illumination with a recording beam and a reference beam.

2. Description of the Related Art

An example of the conventional hologram recording medium is disclosed in JP-A-H09-305978. The hologram recording medium described in this reference has a configuration in which a transparent dielectric layer is laminated over the entire one surface of a disk-like substrate and a hologram recording layer is laminated thereon. The hologram recording medium as a whole has a disk-like shape. Emboss pits for the track servo are formed at a ratio of 3 pits per 1 track on the boundary surface of the transparent dielectric layer serving as a boundary with the substrate. One emboss pit is positioned exactly on the track, whereas the remaining two emboss pits are located in the positions offset in the opposite directions (radial direction) with respect to the track so as to sandwich the track therebetween. For example, during recording, the boundary surface of the transparent dielectric layer where the emboss pits have been formed is illuminated from the substrate side with a first illumination beam for recording (reference beam) so that the beam is converged on the boundary surface, and a second illumination beam for recording (recording beam) is illuminated from the side of the hologram recording layer so as to overlap the first illumination beam for recording, while being converged in the location on this side of the hologram recording layer. As a result, an interference pattern generated due to overlapping of the first illumination beam for recording and second illumination beam for recording is recorded as a hologram on the hologram recording layer. At this time, the reflected light created by the first illumination beam for recording reflected at the boundary surface of the transparent dielectric layer is converted with a photodetector into a reproduction signal, the optical system is displaced based on this reproduction signal so that the amplitudes corresponding to the two aforementioned offset emboss pits become equal to each other and the track servo is thereby conducted.

However, in the above-described conventional hologram recording medium, the offset quantity of the emboss pits for the track servo is comparatively small. Therefore, the first illumination beam for recording undergoes diffraction in the gap between the emboss pits, and the diffracted beam generated thereby reaches the hologram material layer. As a result, the unnecessary interference pattern created by the diffracted beam is also recorded in the hologram material layer. Another problem is that the first illumination beam for recording serving as the reference beam is intensity modulated by the emboss pits and, therefore, the SN ratio is at a low level during recording and reproduction.

With the foregoing in view, it is an object of the present invention to provide a hologram recording medium having a structure in which the recording beam and reference beam are guided in the prescribed direction and making it possible to realize a high SN ratio.

SUMMARY OF THE INVENTION

In order to attain the above-descried object, the present invention employs the following technical features.

According to the present invention, there is provided a hologram recording medium comprising: a hologram recording layer for recording an interference pattern of a recording beam and a reference beam; and another or second layer stacked on the hologram recording layer. The second layer has a layer surface formed with a plurality of trace zones for guiding the recording beam and the reference beam in a guide direction. Each of the trace zones has a higher reflectance than that of a remaining area in the layer surface of the second layer.

Preferably, the plurality of trace zones are provided at predetermined intervals in a direction perpendicular to the guide direction.

Preferably, the hologram recording medium of the present invention may further comprise a reflecting zone for servo introduction formed in at least one zone area between the plurality of trace zones.

Preferably, the second layer comprises a transparent substrate layer having a facing surface that faces the hologram recording layer. The trace zone may comprise either a groove filled with a reflecting material or a reflecting film.

Preferably, the hologram recording medium of the present invention may further comprise a support substrate layer, wherein the hologram recording layer is provided between the transparent substrate layer and the support substrate layer.

Preferably, the hologram recording medium of the present invention may further comprise a metal layer or a dielectric layer provided between the hologram recording layer and the support substrate layer.

Preferably, the hologram recording medium of the present invention may further comprise a dielectric layer provided between the hologram recording layer and the transparent substrate layer.

Other specific features and advantages of the present invention will become apparent from the detailed description provided hereinbelow with reference to the appended drawings.

DESCRIPTION OF THE PREFERRED EMBODIMENTS

The preferred embodiment of the present invention will be described below with reference to the accompanying drawings.

Figure 1:
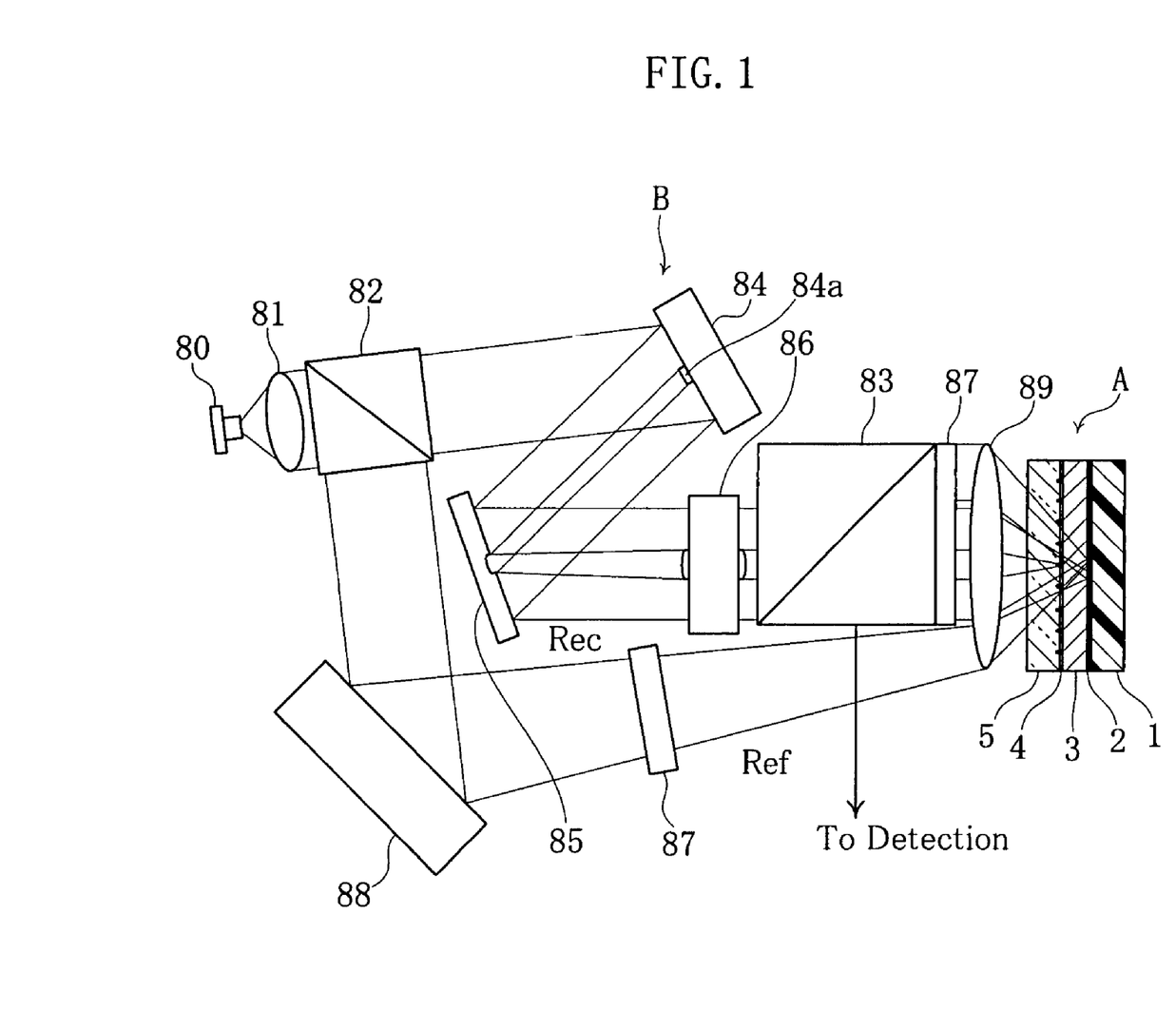
FIG. 1 shows the entire configuration illustrating an embodiment of the hologram recording medium in accordance with the present invention.
Figure 2:
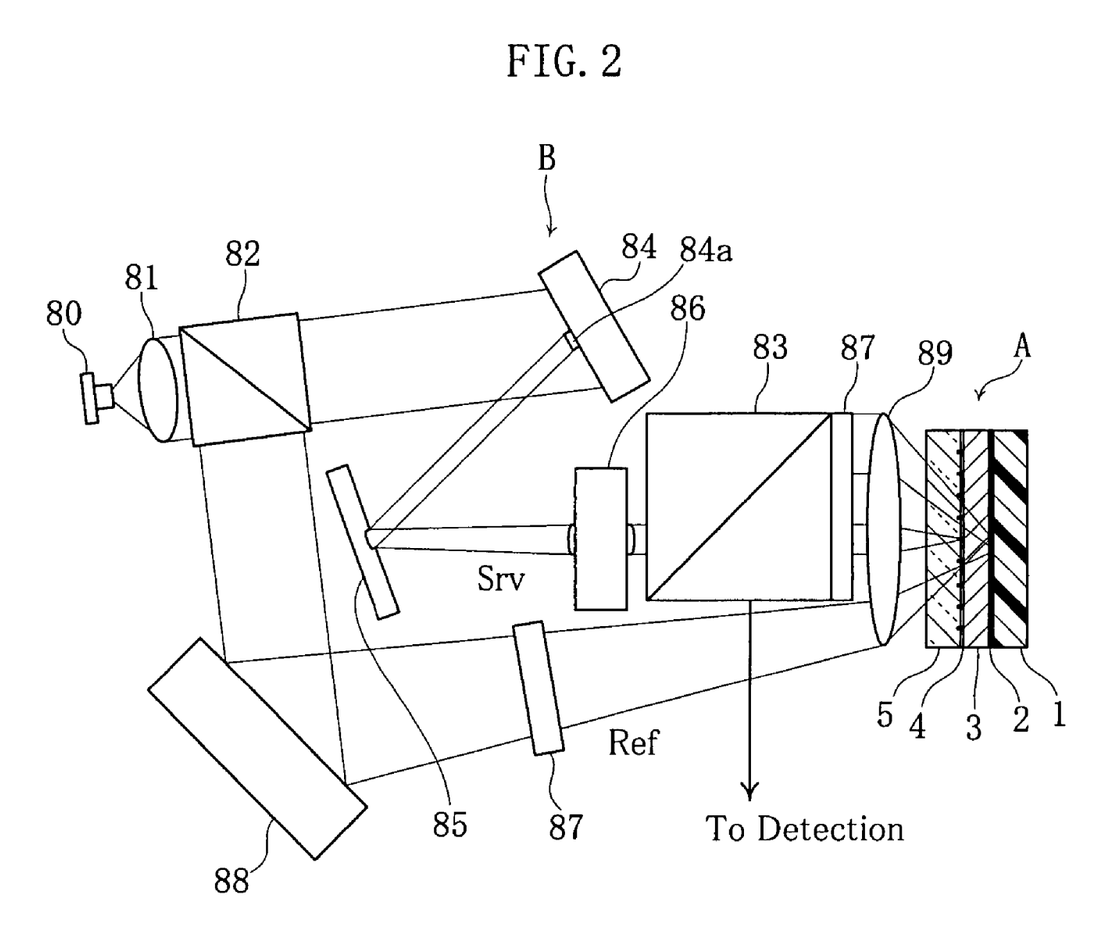
FIG. 2 shows the entire configuration illustrating the state during reproduction of the hologram recording medium shown in FIG. 1.

As shown in FIG. 1 and FIG. 2, the hologram recording medium A in accordance with the present invention is used with a hologram recording device B equipped with various optical systems.

Figure 3:
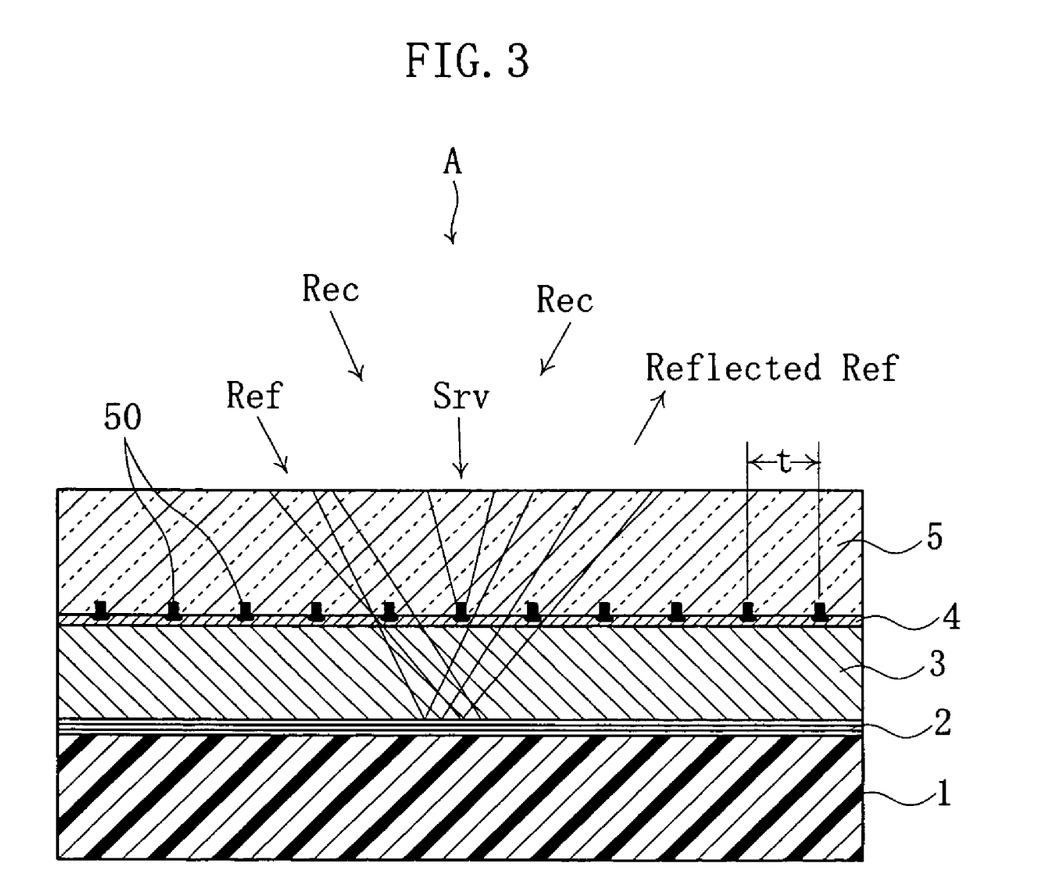
FIG. 3 is a cross-sectional view of the hologram recording medium shown in FIG. 1.

As shown in FIG. 3, the hologram recording medium A, which is circular in the illustrated example, has a structure obtained by laminating a support substrate layer 1, a first dielectric layer 2, a hologram recording layer 3, a second dielectric layer, and a transparent substrate layer 5.

The hologram recording device B comprises a coherent light source 80, a collimator lens 81, first and second beam splitters 82, 83, a recording beam modulation multisplitting mirror 84, first and second splitting prisms 85, 86, a λ/4 plate 87, a two-dimensional reference beam control mirror 88, and an objective lens 89. Though not shown in the figure, use is also made of a drive system for rotating the hologram recording medium A and a detection system for detecting the reflected light from the hologram recording medium A.

First, the configuration of the hologram recording device B will be explained. The coherent light source 80 of the hologram recording device B comprises, for example, a semiconductor laser unit. During recording or reproduction, the light source 80 emits coherent light or laser beam having an appropriately narrow band. The collimator lens 81 converts the laser beam emitted from the coherent light source 80 into a parallel beam. The laser beam outgoing from the collimator lens 81 is guided to the first beam splitter 82. Though not shown in the figure, a beam expander is arranged between the lens 81 and the splitter 82 for increasing the diameter of the collimated beam.

The first beam splitter 82 divides the incident laser beam into two beams: a first laser beam guided to the multisplitting mirror 84 and a second laser beam guided to the control mirror 88 via an optical path different from that of the first laser beam.

During recording, for example, the multisplitting mirror 84 modulates the incident laser beam into a recording beam (Rec) representing two-dimensional information, and provides this recording beam as reflection light. A servo beam splitting mirror 84a, used for dividing the recording beam from a servo beam (Srv), is attached to the central area of the multisplitting mirror 84. Thus, the recording beam is emitted from the areas other than the central area of the multisplitting mirror 84, whereas the servo beam used for track servo or focus servo is emitted from the servo beam splitting mirror 84a in the central area (see FIG. 2).

The recording beam passes through the first and second splitting prisms 85, 86 without being altered, whereas the servo beam is caused to have appropriate power, and those recording beam and servo beam are guided to the second beam splitter 83. The second beam splitter 83 causes the recording beam and the servo beam to propagate toward the λ/4 plate 87 and objective lens 89, while also receiving the light that has passed from the hologram recording medium A through the objective lens 89 and λ/4 plate 87, to guide the light to the detection system. The λ/4 plate 87 provides the transmitted light with a phase difference of n/2.

The control mirror 88 reflects the incident laser beam as a reference beam (Ref) and causes this reference beam to propagate toward the λ/4 plate 87 and objective lens 89. The two-dimensional reference beam control mirror 88 is used as means for variable control of the angle of incidence of the reference beam on the objective lens 89. The objective lens 89 transmits the recording beam or servo beam through the central portion thereof and converges it in the prescribed zone of the hologram recording medium A. On the other hand, the reference beam passes through the portions outside the central portion and is converged so as to overlap the recording beam in the prescribed zone of the hologram recording medium A. The objective lens 89 is designed to have different optical characteristics in the central portion thereof and the portions outside the central portion. The objective lens 89 is configured to be operated by an electromagnetic coil for track servo or focus servo and also for tilt servo.

Figure 8:
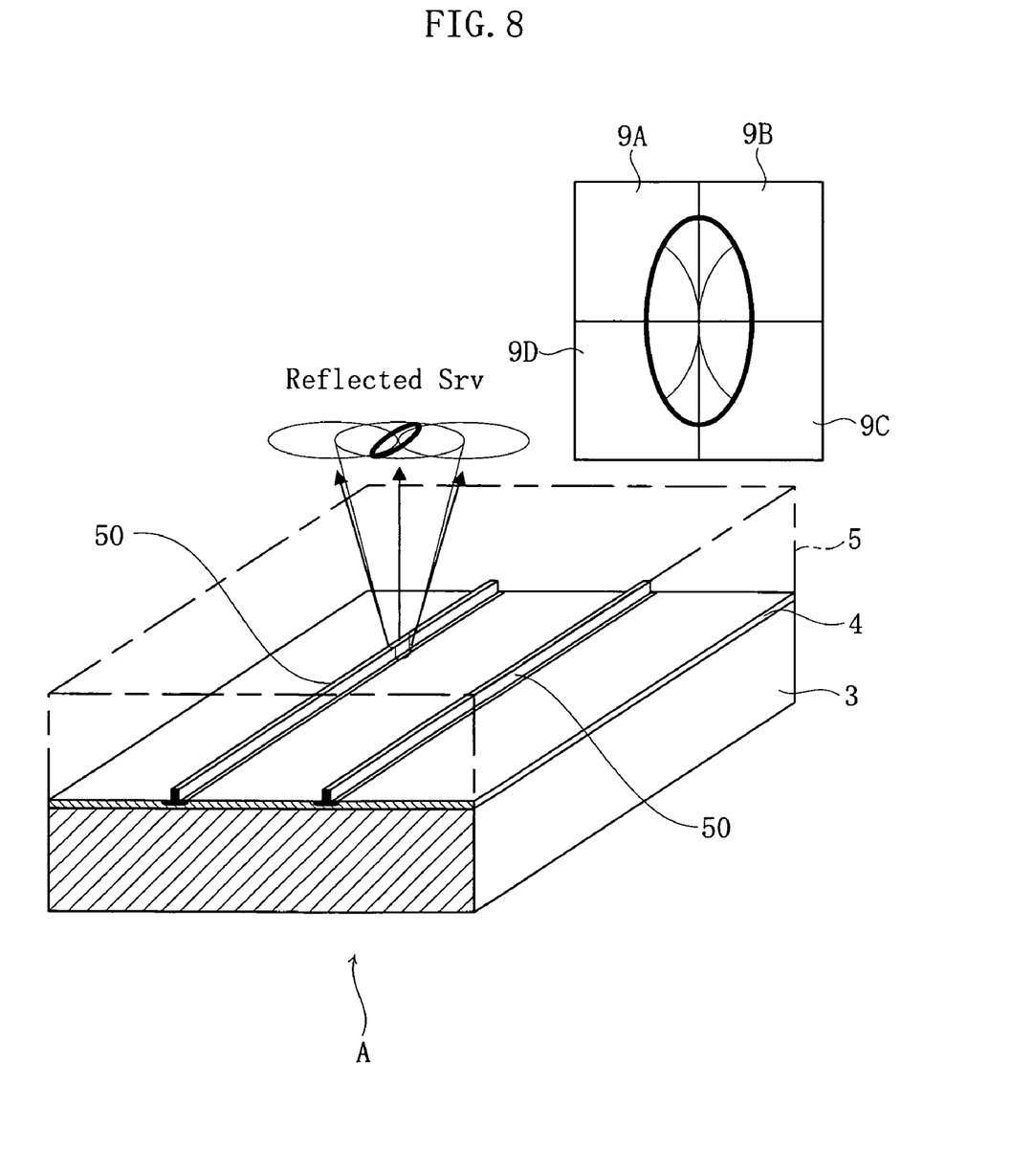
FIG. 8 is an explanatory drawing illustrating the operation of the hologram recording medium shown in FIG. 1.

The detection system is provided with photosensors for detecting reflection light coming from the hologram recording medium A through the objective lens 89 and the second beam splitter 83. Specifically, the detection system includes a "servo beam photosensor" for detecting the reflected beam created by the servo beam for the track servo or focus servo, and a "reference beam photosensor" for detecting the reflected beam created by the reference beam. As shown in FIG. 8, the servo beam photosensor is composed of four split sensors 9A to 9D (which may be four detection regions of a single sensor unit), so that a track shift or focus shift is detected by the light reception pattern created by those split sensors 9A to 9D. The photosensor for the reflected reference beam also comprises four split sensors (not shown in the figures) and is composed so that the tilt quantity (tilt of the hologram recording medium A with respect to the optical axis of the objective lens 89) is detected based on the light reception pattern created by those split sensors.

Furthermore, the detection system is also provided with a two-dimensional detector that is composed, for example, of a CCD area sensor or CMOS area sensor. This detector receives a "reproduction beam" created by the hologram during reproduction, and converts the received reproduction beam into digital signals to provide two-dimensional information.

The configuration of the hologram recording medium A will be explained below. As shown in FIG. 3, the support substrate layer 1 of the hologram recording medium A is composed of a resin which does not transmit light, and the first dielectric layer 2 is provided between the support substrate layer 1 and the hologram recording layer 3. The first dielectric layer 2 is composed of a multilayer dielectric film, and this first dielectric layer 2 is provided to reflect efficiently the reference beam that has passed through the hologram recording layer 3 as a reflected reference beam. The first dielectric layer 2 is so formed as to have as a flat boundary surface with the support substrate layer 1 as possible. A metal film as a reflecting film may be provided in place of the first dielectric layer between the support substrate layer and the hologram recording layer.

The hologram recording layer 3 is composed, for example of a photosensitive photopolymer having a comparatively high diffraction efficiency. The thickness thereof is approximately 200 μm to 1 mm. The hologram recording layer 3 is so illuminated from the side of the transparent substrate layer 5 that the recording beam and reference beam overlap. As a result, a hologram is recorded as an interference pattern of the recording beam and reference beam in the hologram recording layer 3.

The second dielectric layer 4 is, for example a dielectric multilayer film as a thin-film layer or a single-layer thin metallic film. The second dielectric layer 4 is provided to transmit efficiently the reference beam or recording beam that has passed through the transparent substrate layer 5 and to reflect the servo beam to a degree allowing for the focus servo. Such a second dielectric layer 4 is also so formed as to have as flat a boundary surface with the hologram recording layer 3 as possible.

The transparent substrate layer 5 is formed from a resin material through which the recording beam and the reference beam can pass. The transparent substrate layer 5 has a "boundary surface" (the lower surface in FIG. 3) that faces the hologram recording layer 3 via the dielectric layer 4. The boundary surface is formed with a plurality of trace zones 50, each being elongated circumferentially of the circular recording medium A.

As viewed in plan (viewed from above in FIG. 3), the recording medium A can be divided into two kinds of parts in terms of reflectance: a higher reflectance portion and a lower reflectance portion. The higher reflectance portion corresponds to the trace zones 50, while the lower reflectance portion corresponds to the "remaining areas" in the "boundary surface" of the substrate layer 5 where the trance zones 50 are not provided. In other words, the remaining areas correspond to the areas where only the second dielectric layer 4 is present between the substrate layer 5 and the hologram recording layer 3. For each of such trace zones 50, a unit recording area or a "track" is formed to extend circumferentially of the circular medium A.

When the hologram recording medium A rotates during recording or reproduction, illumination with the aforementioned servo beam is adjusted to be focused on a trace zone 50, while the objective lens 89 is so controlled that the reflected servo beam from the trace zone 50 is always detected properly. As a result, the recording beam and the reference beam are guided so as to execute relative motion in the circumferential direction of the medium A by following the trace zone 50, whereby the illumination spot of the recording beam or the reference beam does not deviate from the track.

Figure 4:
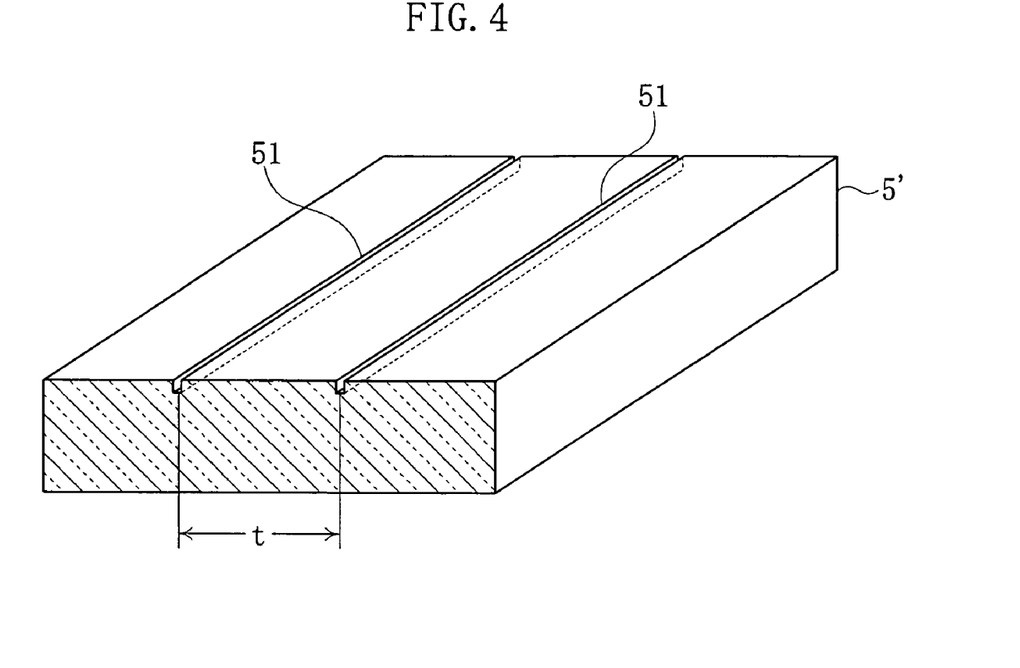
FIG. 4 is an explanatory drawing illustrating the process for the manufacture of the hologram recording medium shown in FIG. 1.
Figure 5:
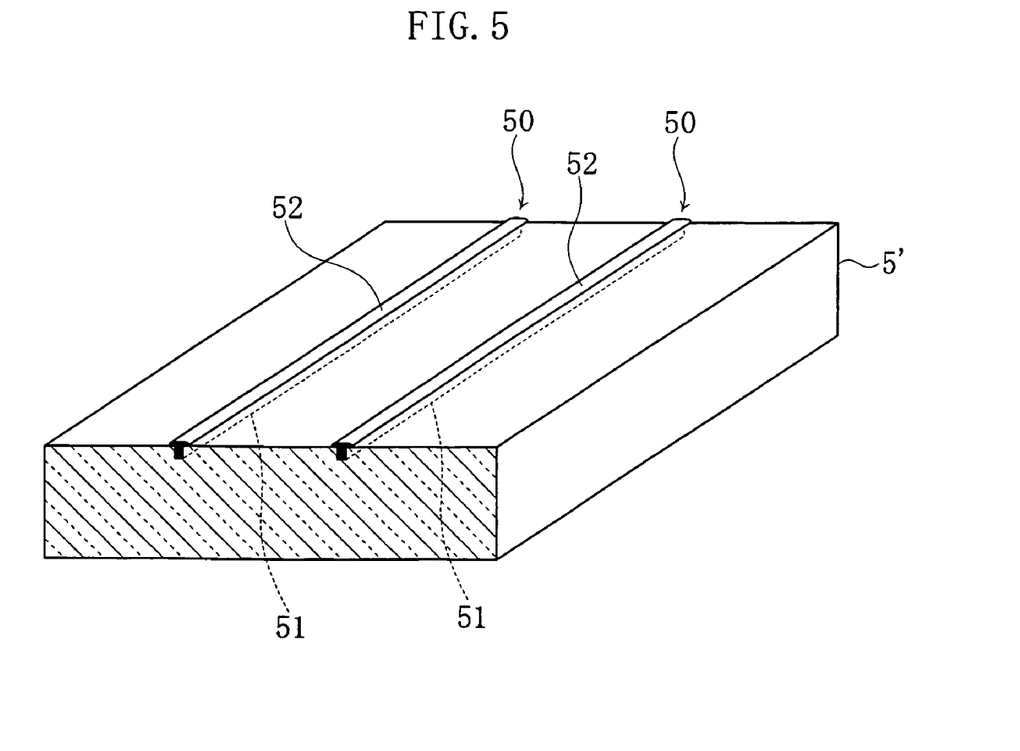
FIG. 5 is an explanatory drawing illustrating the process for the manufacture of the hologram recording medium shown in FIG. 1.
Figure 6:
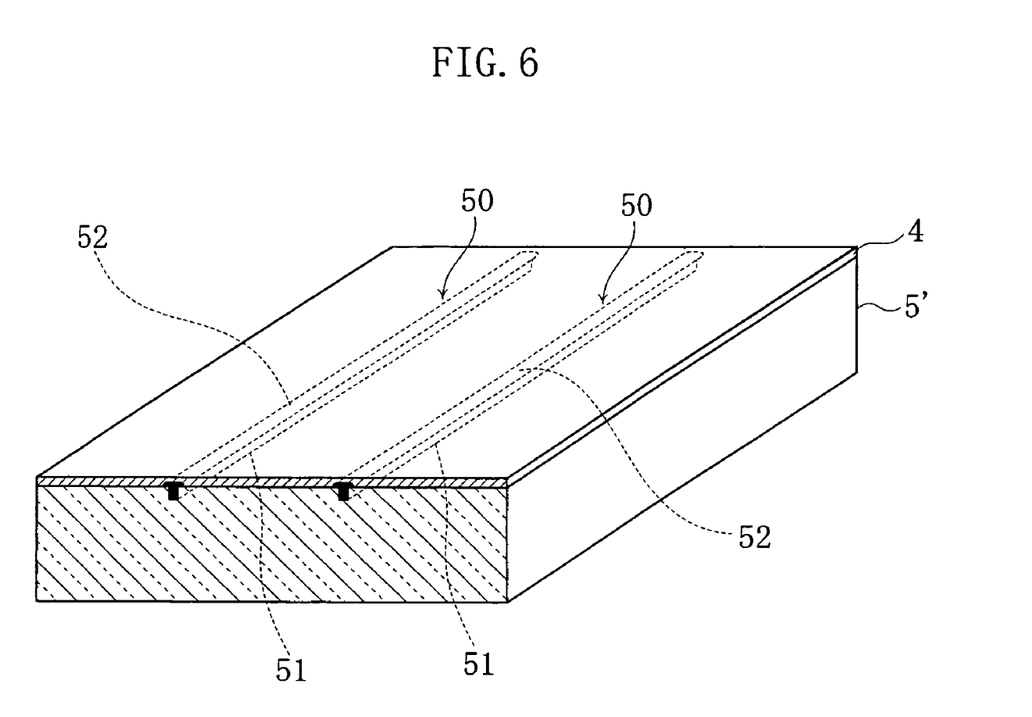
FIG. 6 is an explanatory drawing illustrating the process for the manufacture of the hologram recording medium shown in FIG. 1.

The aforementioned trace zones 50 can be produced via a manufacturing process illustrated in FIGS. 4 to 6. First, referring to FIG. 4, a round disk-like transparent substrate 5' is prepared as a starting material for the transparent substrate layer 5. Grooves 51 in the form of circular arcs are formed with the prescribed spacing, t, along the radial direction on one surface of the transparent substrate 5'. Then, as shown in FIG. 5, each groove 51 is filled with a metal 52, for example, aluminum or chromium, as a reflecting material. This is conducted by sputtering, vapor deposition, or plating by using a prescribed mask pattern. At this time, the metal 52 is formed so as to be exposed to a certain degree beyond the opening of the groove 51, and thus the trace zones 50 are obtained. The depth and width of each groove 51 are determined according to optical characteristics of the servo beam or the like. For example, if the refractive index of the transparent substrate layer 5 is denoted by "n" and the wavelength of the servo beam is denoted by "$\lambda$", then the depth of the groove 51 is approximately $\lambda/(8 \times n)$.

Specifically, the wavelength $\lambda$ of the servo beam is 407 nm, for example, and the size of the illumination spot of the servo beam is 0.6 µm in the direction parallel to the groove 51 and 2.3 µm in the direction perpendicular to the groove 51. In this case, the width of the groove 51 may be approximately 1.9 µm, and the overall width of the trace zone 50 (i.e., the maximum width the exposed portion of metal 52 included) is approximately 5-6 µm.

Figure 7:
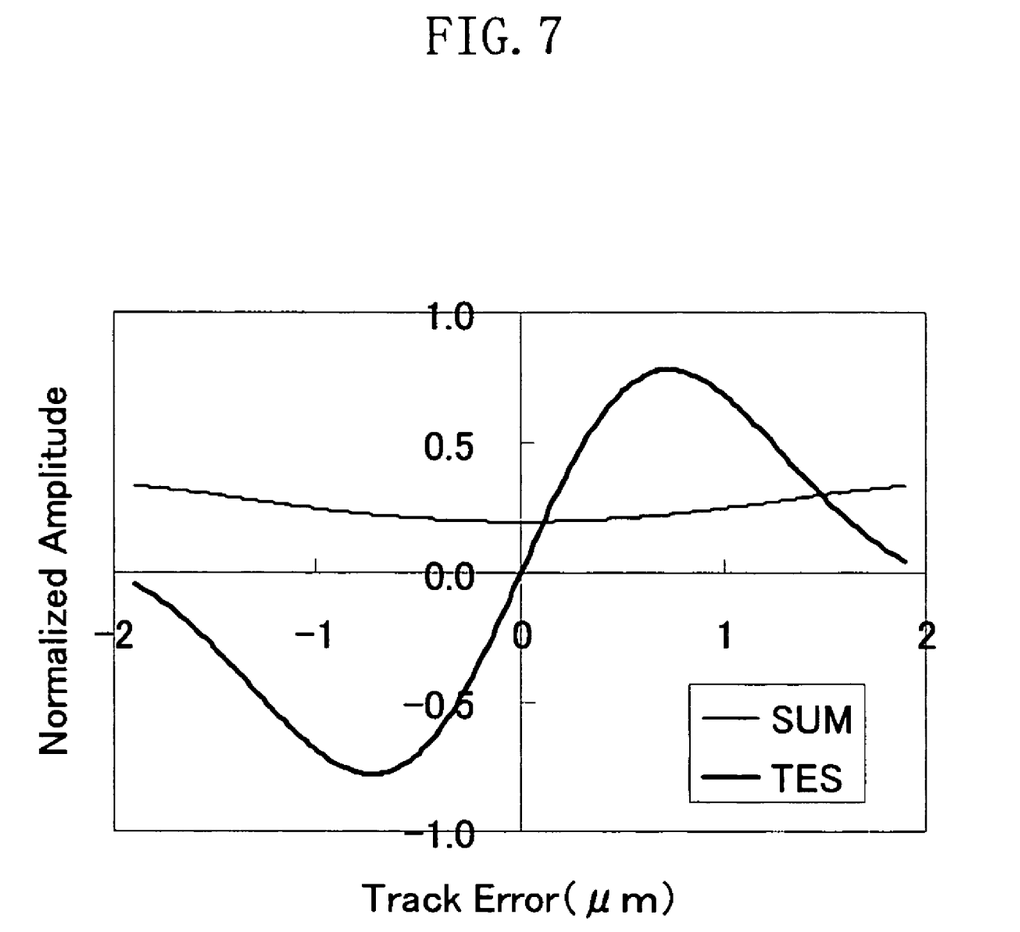
FIG. 7 is an explanatory drawing illustrating the operation of the hologram recording medium shown in FIG. 1.

In the above example, simulation was conducted to find the track error signals based on the reflected servo beam from the trace zone 50, and FIG. 7 shows the results. The results suggest that the track servo can be sufficiently conducted when the width of the groove 51 is approximately 1.9 µm. The spacing, t, between the trace zones 50 may be 20 to 500 µm. This size contains, for example, only two trace zones 50 in the illumination spot of the recording beam, that is, being of the same order as the diameter of the illumination spot of the recording beam (see FIG. 3).

After the trace zones 50 are made, the second dielectric layer 4 is coated, as shown in FIG. 6, from the top of the trace zones 50 so as to entirely cover the upper surface of the transparent substrate 5'. Meanwhile, a disk-like support substrate, serving as a starting material for the support substrate layer 1, is prepared. Then, a dielectric layer (the first dielectric layer 2) is formed on a surface of the support substrate (see FIG. 3).

After the transparent substrate 5' (having the second dielectric layer 4 formed thereon) and the support substrate (having the first dielectric layer 2 formed thereon) are obtained, the substrate 5' and the support substrate are held in a frame with a posture such that the first and the second dielectric layers 2, 4 face each other with a prescribed spacing present therebetween. In this state, a liquid photopolymer is poured between the first and the second dielectric layers 2, 4 (hence between the substrate 5' and the support substrate), and then cured to provide the solid hologram recording layer 3. Accordingly, as shown in FIG. 3, the hologram recording medium A is obtained, which has the hologram recording layer 3 as an intermediate layer.

With the manufacturing process described above, a flat surface can be easily formed at the interface of the dielectric layers 2, 4 and the transparent substrate layer 5, whereby the cost can be easily reduced. According to the present invention, an adhesive layer may be provided to increase the adhesivity between the first or second dielectric layer and the hologram recording layer 3.

The operation of the hologram recording medium A will be explained below.

The focus servo is conducted prior to entering the recording state shown in FIG. 1. In the focus servo, the hologram recording medium A being rotating is illuminated with the laser beam emitted from the coherent light source 80 as a servo beam. As seen from the figure, the emitted beam successively passes through the collimator lens 81, the first beam splitter 82, the recording beam modulation multisplitting mirror 84, the servo beam splitting mirror 84a, the first and second splitting prisms 85, 86, the second beam splitter 83, the $\lambda/4$ plate 87, and the objective lens 89.

In this process, illumination with the recording beam is prevented by controlling the multisplitting mirror 84 and the illumination with the reference beam is also prevented by controlling the control mirror 88. The servo beam is so illuminated that the illumination spot is located in the area outside the trace zones 50 ("non-trace area"). With such a focus servo, the objective lens 89 assumes a focus locked state such that the focus is adjusted on the non-trace area in accordance with the focus error signal corresponding to the reflected servo beam from the non-trace area.

The track servo is then conducted while the objective lens 89 is in the focus locked state. In the track servo, as shown in FIG. 8, illumination is conducted only with the servo beam so that the illumination spot is positioned on the trace zone 50 corresponding to the desired track, and neither the recording beam nor the reference beam are used for illumination. The reflected servo beam reflected by the trace zone 50 is detected with the split sensors 9A to 9D. For example, a tracking error signal composed of a positive or negative value or of a 0 value is found (FIG. 7) by calculating the difference between the signal (A+D) detected by the two split sensors 9A, 9D (corresponding to one side of the trace zone 50) and the signal (B+C) detected by the two split sensors 9B, 9C (corresponding to the opposite side of the trace zone 50), and then dividing the calculated difference by the sum (A+B+C+D) of those signals.

When the value of this tracking error signal is 0, the illumination spot of the servo beam is accurately positioned on the desired trace zone 50 and a state without track shift is assumed. On the other hand, when the servo beam shifts from the trace zone 50, the servo beam is subjected to phase modulation because the trace zone 50 has a three-dimensional structure. As a result, deviation occurs in the intensity of signals detected by the split sensors 9A to 9D, whereby a tracking error signal composed of a positive or negative value is obtained. In such a case, the track servo is conducted by controlling the objective lens 89 so that the value of this tracking error signal becomes 0. At this time, almost the entire servo beam is reflected as the reflected servo beam by the three-dimensional trace zone 50. Therefore, no diffracted beam leaks into the hologram recording layer 3. As a result, the hologram recording layer 3 is not photosensitized during the track servo process, that is, prior to recording.

When the illumination spot of the servo beam is positioned on the desired trace zone 50 in the above-described manner, then the tilt servo is conducted. In the tilt servo, as shown in FIG. 3, illumination with the reference beam is so conducted that the reference beam passes in the vicinity, for example, within several hundreds of microns, of the trace zone 50 where the servo beam was positioned, and the reflected reference beam that was reflected by the non-trace area is detected. When there is a deviation in the distribution of this reflected reference beam, then the hologram recording medium A is judged to be in a tilted state with respect to the optical axis of the objective lens 89. In this case, this tilt is corrected, for example, by tilting the objective lens. Alternatively, the tilt may be also corrected by tilting the rotary shaft supporting the hologram recording medium A.

After the focus servo, the track servo, and the tilt servo are conducted, illumination with the recording beam and reference beam is conducted so as to match the prescribed position on the desired trace zone 50 (see FIG. 1). As a result, the recording beam and reference beam overlap on the hologram recording layer 3, and a hologram as an interference pattern of the recording beam and reference beam is recorded on the hologram recording layer 3. At this time, as shown in FIG. 8, the trace zone 50 is also illuminated with the servo beam. However, as mentioned above, the servo beam does not leak into the hologram recording layer 3, and therefore the hologram is recorded with good efficiency only by the recording beam and reference beam. Furthermore, only one desired trace zone 50 is contained within the range of the illumination spot of the recording beam, and the width of this trace zone 50 is sufficiently small by comparison with the diameter of the illumination spot. Therefore, the recording beam is used with good efficiency.

Generally, when a hologram is recorded, the angle of incidence of the reference beam with respect to the hologram recording layer 3 may be changed each time the hologram recording medium A is temporarily stopped, so that multiplexing recording of the hologram is conducted. In this case, the area illuminated by the recording beam is easily heated. According to the present invention, however, the reflectance of the trace zone 50 positioned in the area is advantageously high (substantially 100%), and therefore fracture or damage of the trace zone 50 caused by heating-induced melting is prevented. Furthermore, a method in which the relative angle formed by the recording beam and the reference beam is varied by rotating the hologram recording medium A. In this case, the hologram is multiplex-recorded in the circumferential direction of the hologram recording medium A.

Prior to entering the reproduction state shown in FIG. 2, the focus servo, the track servo, and the tilt servo are also conducted in the same manner as prior to entering the above-described recording state. During reproduction (after the focus servo, track servo, and tilt servo have been conducted), illumination with the servo beam and reference beam is conducted so as to match the prescribed position on the desired trace zone 50 (see FIG. 2). As a result, a reproduction beam corresponding to the recorded hologram and reference beam is generated from the hologram recording layer 3, and this reproduction beam is successively passed through the objective lens 89, the λ/4 plate 87, and the second beam splitter 83, and is received by a two-dimensional detector. As a result, information recorded as a hologram is reproduced by the two-dimensional information beam. During such reproduction, too, the servo beam is prevented from leaking to the hologram recording layer 3, whereby the information recorded as a hologram can be read with good efficiency.

With the hologram recording medium A of the present embodiment, though the trace zone 50 is provided in a position overlapping the recording beam, the recording beam and reference beam are illuminated with good efficiency toward the hologram recording layer 3, practically without intensity modulation of the recording beam or reference beam by the trace zone 50. Therefore, a high SN ratio can be realized during recording and reproduction.

Figure 9:
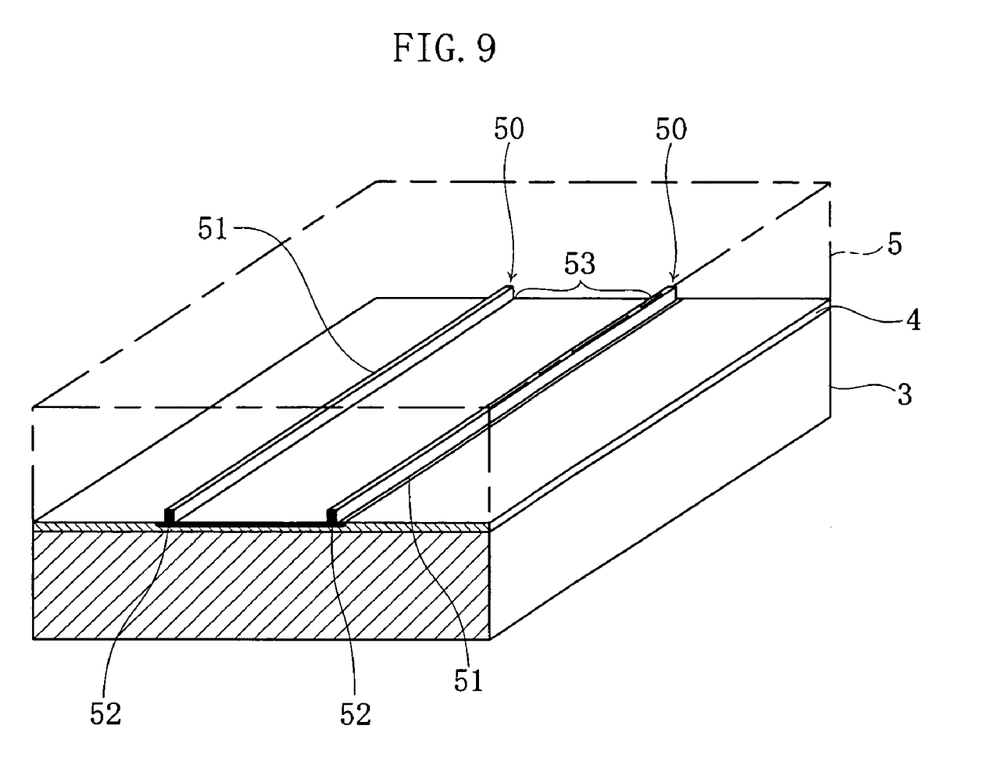
FIG. 9 is a perspective view illustrating another embodiment of the hologram recording medium in accordance with the present invention.
Figure 10:
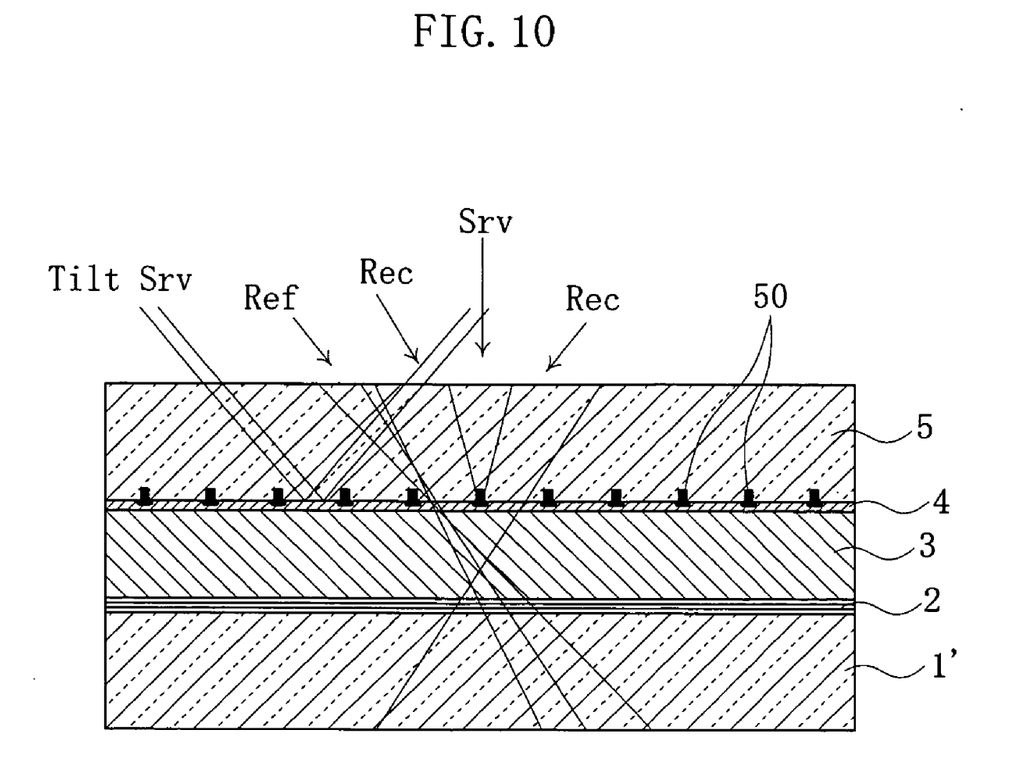
FIG. 10 is a cross-sectional view illustrating another embodiment of the hologram recording medium in accordance with the present invention.
Figure 11:
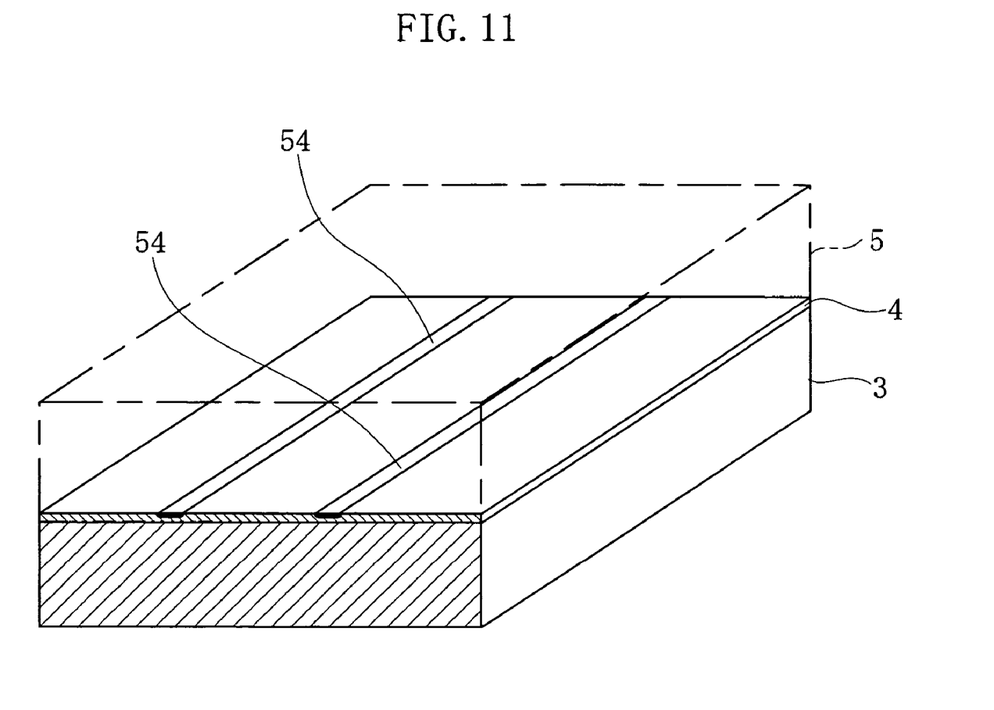
FIG. 11 is a perspective view illustrating another embodiment of the hologram recording medium in accordance with the present invention.

The present invention is not limited to the above-described embodiment. Other embodiments are shown in FIGS. 9 to 11. In these figures, elements identical or similar to the elements of the above-described hologram recording medium A are assigned with the same symbols.

In the hologram recording medium shown in FIG. 9, a reflection zone 53 for focus servo introduction is formed by forming the metal 52 of the same type as used for filling the groove 51 as a film of uniform thickness over the entire zone segment between the prescribed trace zone 50 and trace zone 50. This reflection zone 53 is illuminated with the servo beam when the focus servo is conducted. With such a reflecting zone 53, the servo beam is reflected more. Therefore, the accuracy of focus servo can be increased. Moreover, extra photosensitizing of the hologram recording layer 3 during the above-described initial focus servo can be avoided. For example, one reflecting zone for focus servo introduction may be provided in the vicinity of the innermost or outermost peripheral zone of the hologram recording medium, or a plurality of such zones may be provided with the prescribed spacing therebetween.

In the hologram recording medium shown in FIG. 10, a transparent support substrate layer 1' is provided on one side of the hologram recording layer 3. With such a hologram recording medium of the two-surface transmission-type, the recording beam or reference beam illuminated from the side of the transparent substrate 5 toward the hologram recording layer 3 passes to the outside through the hologram recording layer 3 and support substrate layer 1'. For this reason, a light source other than the coherent light source that does not photosensitive the hologram recording layer 3 is used at a wavelength different from that of the recording beam or reference beam, and the hologram recording medium is illuminated with the beam of this other light source as a beam for the tilt servo. This beam for the tilt servo illuminates the location distant from the illumination spot of the reference beam, and the light reflected in this location is detected with a split sensor for the tilt servo. When such a hologram recording medium the two-surface transmission-type is used, the configuration thereof provides for the detection of the reproduction beam with a two-dimensional detector disposed at the side of the support substrate layer 1'. Further, the beam for the tilt servo may be reflected by the second dielectric layer 4 provided between the transparent substrate layer 5 and the hologram recording layer 3, as shown in FIG. 10, or may be reflected by the first dielectric layer 2 provided between the hologram recording layer 3 and the support substrate layer 1'.

In the hologram recording medium shown in FIG. 11, the trace zone 50 is composed of a reflecting film 54 of a comparatively small thickness. The reflecting film 54 is composed, for example, of a dielectric multilayer film or an amorphous material and is so configured that, similarly to the above-described embodiment, phase modulation is induced when the servo beam is shifted. With the trace zone 50 composed of such a reflecting film 54, almost the entire servo beam is also reflected by the trace zone 50 and the diffracted beam created by the servo beam is prevented from leaking to the hologram recording layer 3. Therefore, the track servo can be conducted with good efficiency, without photosensitizing the hologram recording layer 3.

Further, the hologram recording medium as a whole can have, for example, a rectangular shape in the plan view thereof (this configuration is not shown in the figures). With such a hologram recording medium, a plurality of trace zones are formed parallel to the prescribed side and during recording or reproduction, the hologram recording medium is moved linearly with respect to the objective lens along the direction parallel to the trace zones. It goes without saying, that the optical system such as the objective lens may be moved linearly in the direction parallel to the trace zones.

The invention claimed is:

1. A hologram recording medium comprising:
   a hologram recording layer for recording an interference pattern of a recording beam and a reference beam; and
   another layer stacked over a light incident side of the hologram recording layer;
   wherein said another layer has a layer surface formed with a plurality of trace zones for guiding the recording beam and the reference beam in a guide direction,
   wherein each of the trace zones has a higher reflectance than that of a remaining area in the layer surface of said another layer.

2. The hologram recording medium according to claim 1, wherein the trace zones are provided at predetermined intervals in a direction perpendicular to the guide direction.

3. The hologram recording medium according to claim 2, further comprising a reflecting zone for servo introduction formed in at least one zone area between the plurality of trace zones.

4. The hologram recording medium according to claim 1, wherein said another layer comprises a transparent substrate layer having a facing surface that faces the hologram recording layer, the trace zone comprising either a groove filled with a reflecting material or a reflecting film.

5. The hologram recording medium according to claim 4, further comprising a support substrate layer, wherein the hologram recording layer is provided between the transparent substrate layer and the support substrate layer.

6. The hologram recording medium according to claim 5, further comprising a metal layer or a dielectric layer provided between the hologram recording layer and the support substrate layer.

7. The hologram recording medium according to claim 4, further comprising a dielectric layer provided between the hologram recording layer and the transparent substrate layer.

8. The hologram recording medium according to claim 1, wherein each of the trace zones is made of a reflective material which is different from a material for said another layer and has a higher reflectance than the material for said another layer.

9. A hologram recording medium comprising:
   a hologram recording layer for recording an interference pattern of a recording beam and a reference beam; and
   another layer stacked over the hologram recording layer;
   wherein said another layer has a layer surface formed with a plurality of trace zones for guiding the recording beam and the reference beam in a guide direction
   wherein each of the trace zones has a higher reflectance than that of a remaining area in the layer surface of said another layer, and
   wherein said another layer comprises a transparent substrate layer having a facing surface that faces the hologram recording layer, the trace zone comprising either a groove filled with a reflecting material or a reflecting film.

* * * * *